United States Patent
Westbrook et al.

[11] Patent Number: 6,029,433
[45] Date of Patent: Feb. 29, 2000

[54] LAWN MOWER ROLLER BRUSH MOUNTING AND DRIVE

[75] Inventors: Lynn G. Westbrook, Racine; Gregory J. Chesack, Kenosha, both of Wis.

[73] Assignee: Textron Inc., Providence, R.I.

[21] Appl. No.: 09/105,941

[22] Filed: Jun. 26, 1998

[51] Int. Cl.[7] .......................... A01D 34/62; A01D 34/52
[52] U.S. Cl. .................... 56/249; 56/7; 56/294
[58] Field of Search .................... 56/11.6, 249, 294, 56/7, DIG. 20; 474/8, 17, 46, 144, 146, 148, 150

[56] References Cited

U.S. PATENT DOCUMENTS

| | | | |
|---|---|---|---|
| 3,269,201 | 8/1966 | Looker | 474/46 |
| 4,021,996 | 5/1977 | Bartlett | 56/7 |
| 5,228,277 | 7/1993 | Smith et al. | 56/16.9 |
| 5,343,680 | 9/1994 | Reichen et al. | 56/7 |
| 5,377,774 | 1/1995 | Lohr | 474/8 |
| 5,461,848 | 10/1995 | Anthony | 56/DIG. 20 |
| 5,477,666 | 12/1995 | Cotton | 56/7 |
| 5,669,212 | 9/1997 | Bening et al. | 56/16.9 |
| 5,682,735 | 11/1997 | Swenson et al. | 56/249 |

*Primary Examiner*—Thomas B. Will
*Assistant Examiner*—Meredith C. Petravick
*Attorney, Agent, or Firm*—Arthur J. Hansmann

[57] ABSTRACT

A lawn mower roller brush mounting and drive for a reel type lawn mower. The brush extends along the length of the roller and is rotatable and in contact with the roller for removing grass and like debris from the roller. A belt drive of automatic adjustment arrangement extends between the reel and the brush for rotating the brush. A cover completely encloses the pulleys and belt.

6 Claims, 4 Drawing Sheets

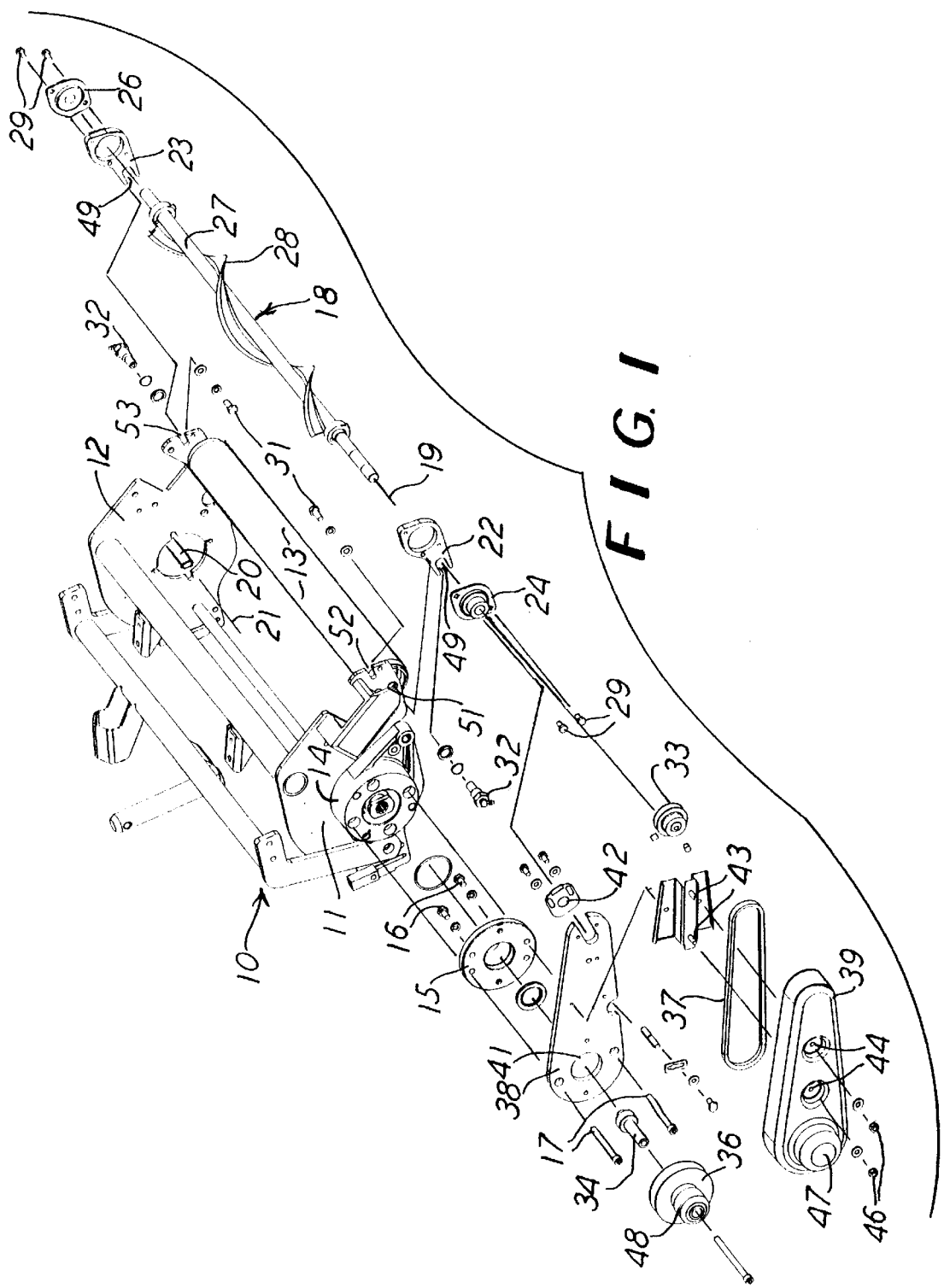

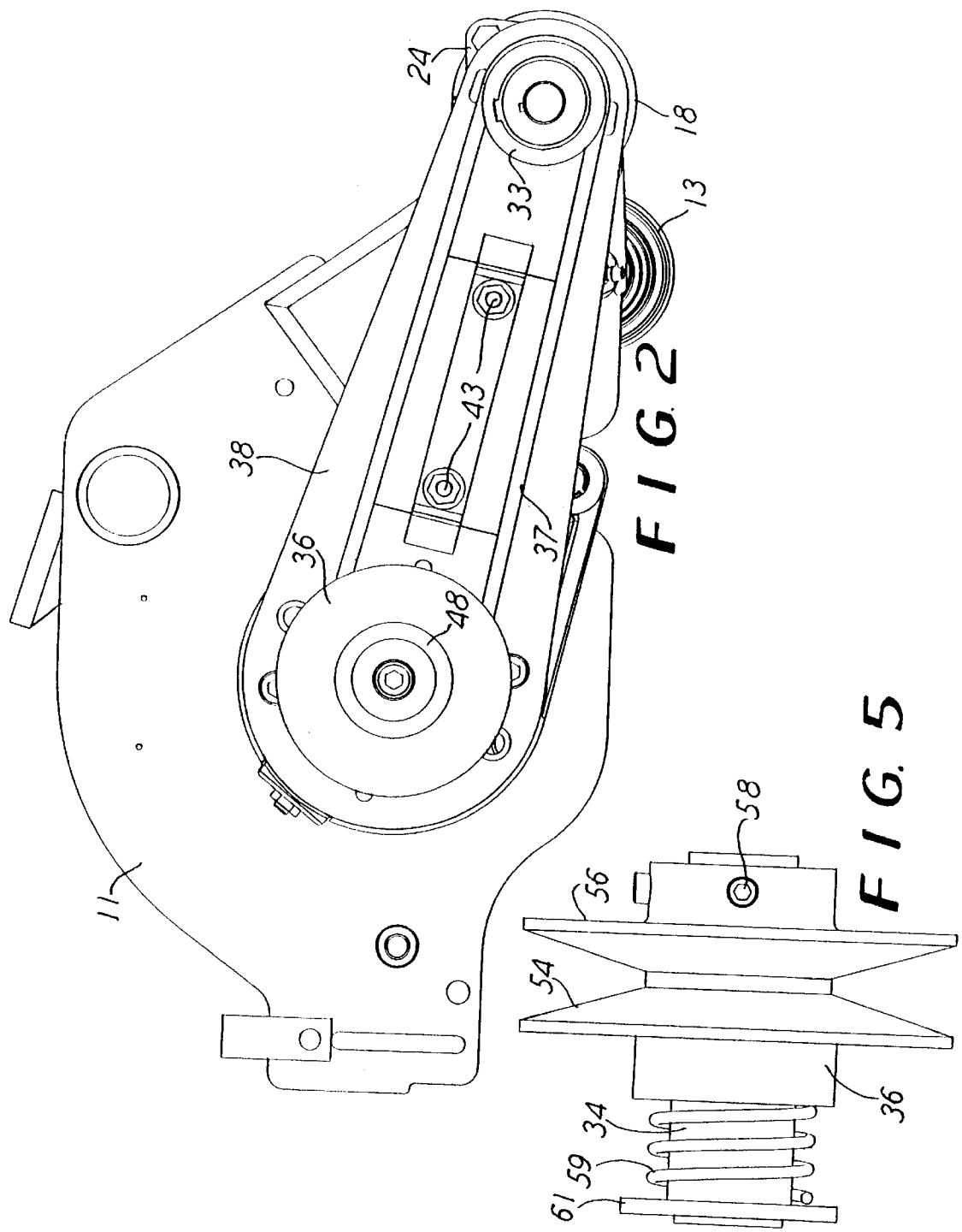

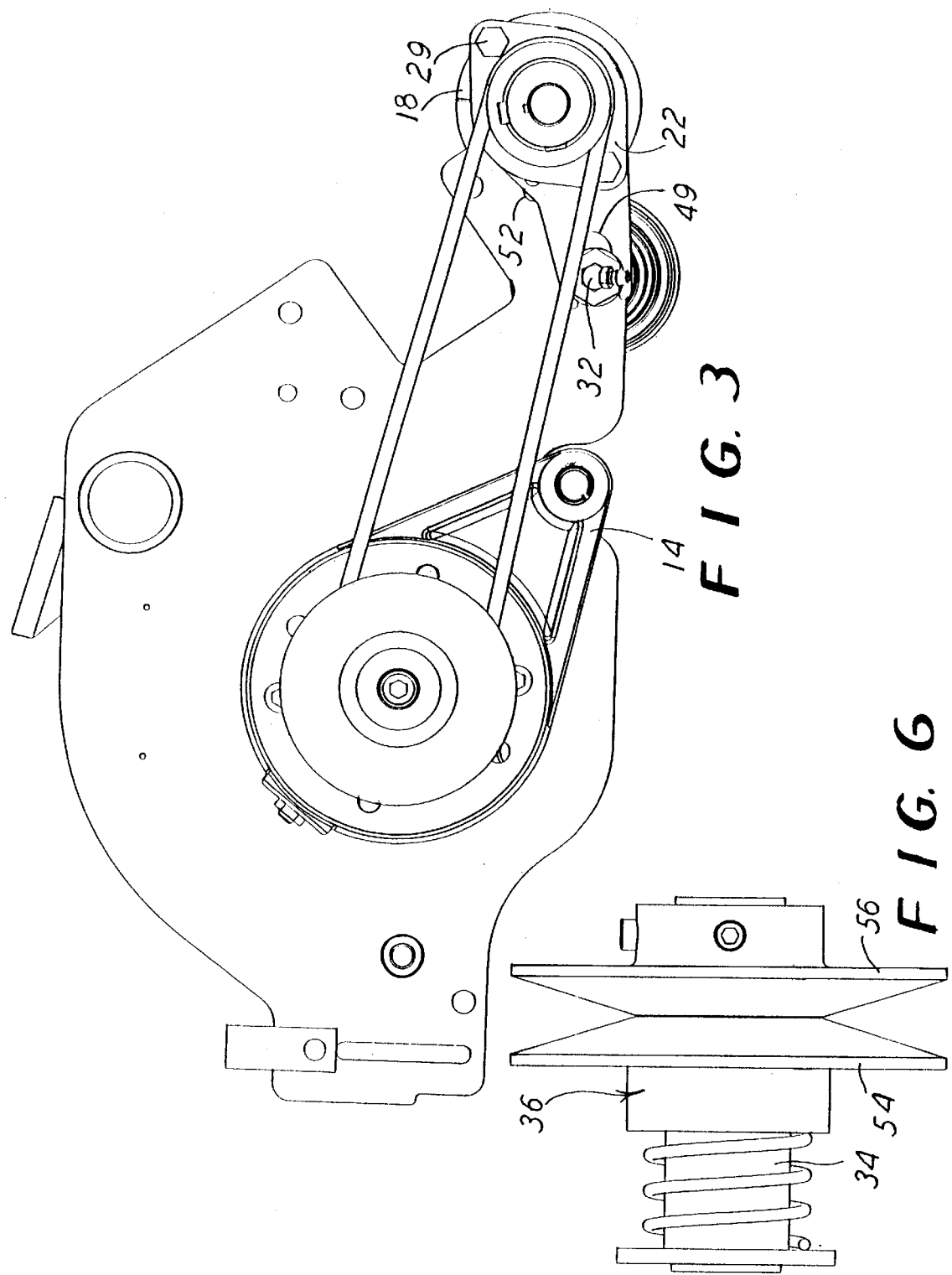

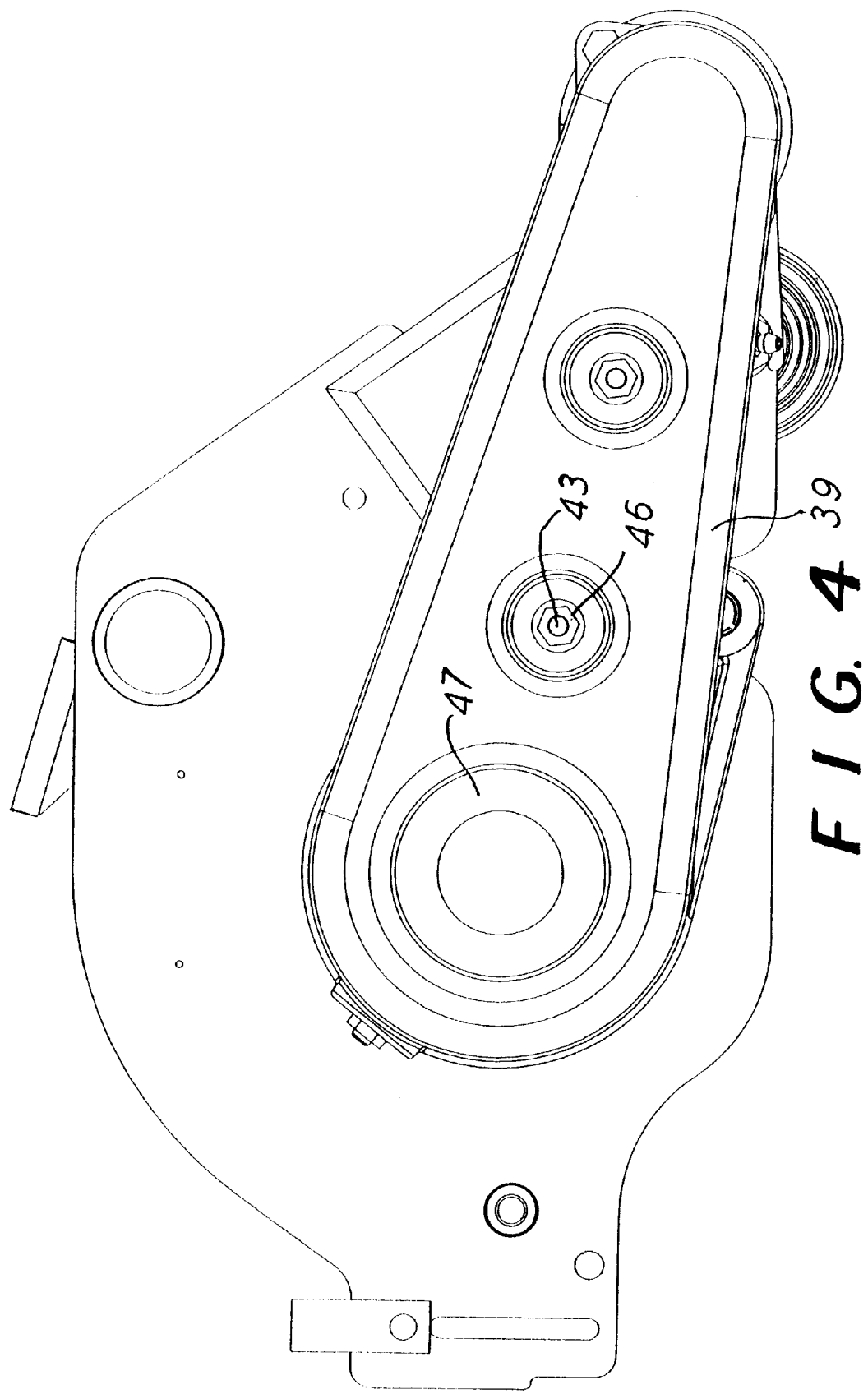

6,029,433

LAWN MOWER ROLLER BRUSH MOUNTING AND DRIVE

This invention relates to a lawn mower roller brush mounting and drive, and, more particularly, it relates to a rotatably mounted brush operative on the lawn mower roller.

BACKGROUND OF THE INVENTION

The prior art is already aware of arrangements wherein there is a rotatable brush operating on the lawn mower roller for cleaning the cut grass blades and like debris from the roller during the activity of grass mowing. There are concerns with regard to rotatably driving the brush for its cleaning function, and some drives are gear drives and some are belt drives, with both drives being responsive to the rotation of the mower cutting reel.

The present invention accomplishes rotational drive of the brush, and it also has the brush adjustably arranged for positioning relative to the lawn mower roller for the brushing thereof. Further, in the present invention, the brush is rotatably driven by means of a belt powered from the reel itself, and the belt is self-adjusting with regard to its tension and it thereby is always in driving relationship with the roller and need not have idlers or the like for adjusting belt tension.

Still further, the present invention has a mounting for the brush wherein the brush can be adjusted toward and away from the roller and, in doing so, the belt tension is also involved and is automatically accommodated in this arrangement. Still further, there is a cover, in the form of a complete enclosure, for the belt and its two end pulleys, and thus the moving parts are completely enclosed and concealed against harmful contact and foreign debris and the like.

In accomplishing the aforementioned, the present invention is sturdy, reliable, but yet inexpensive and lightweight to thereby be highly desirable on a lawn mower which utilizes the cleaning brush.

BRIEF DESCRIPTION OF THE DRAWINGS

FIG. 1 is an exploded view of a lawn mower with the roller and brush and the drive to the latter, shown therein.

FIG. 2 is an enlarged side elevational view of FIG. 1, in the partly assembled condition.

FIG. 3 is a side elevational view similar to FIG. 2, but with a cover part removed.

FIG. 4 is a side elevational view similar to FIG. 2, but with the cover thereon.

FIG. 5 is a front elevational view of one of the pulleys utilized in this invention.

FIG. 6 is a view similar to FIG. 5, but with the pulley in the contracted position.

DETAILED DESCRIPTION OF THE PREFERRED EMBODIMENT

FIG. 1 shows a conventional lawn mower, generally designated 10, and with the conventional rotatable reel unshown but would of course be positioned between the two spaced-apart side plates 11 and 12. Also, a ground-engaging roller 13 is suitably rotatably supported on the side plates 11 and 12 and it presents a longitudinal axis extending centrally of the roller and along the shown length thereof. The mower 10 would normally be suitably connected with an unshown tractor for propelling the mower over the turf where the grass is to be mowed.

The mower 10 also includes the usual bearing housing 14, the adaptor plate 15, the mounting bolts 16, and the mounting cap screws 7.

A rotatably mounted roller brush 18 is included in the assembled mower, and it has a longituditial axis extending along the line designated 19 and that is parallel to the longitudinal axis of the roller 13 and also is parallel to the longitudinal axis of the unshown mower reel, and that would extend along the line designated 21.

Thus, the brush 18 is on one side of the roller 13, and the unshown reel with its longitudinal axis 21 is on the other side of the roller 13, and the reel is shown as shaft 20.

Two spaced-apart bearing housings 22 and 23 are adjustably attached to the respective side plates 11 and 12. The bearing housings 22 and 23 respectively receive brush bearings 24 and 26, and the assemblies are referred herein as the bearings or supports for the brush 18. Of course the brush 18 has its central shaft 27 and the radially-extending brushes or bristles 28 which are actually in rolling brushing contact with the surface of the roller 13 when properly positioned, adjusted, and both are rotating.

Bolts 29 connect the bearings 24 and 26 to the housings 22 and 23, respectively, to assemble the supports mentioned.

Bolts 31, and bolt assemblies 32, with grease fittings therein, connect the brush supports to the respective side plates 11 and 12, all as indicated by the extension lines showing the exploded relationship of parts.

A pulley 33 is suitably mounted on the brush shaft 27 to rotate the latter, and the pulley 33 is rotatably supported adjacent the bearing 24. Also, a pulley shaft 34 is suitably connected with the unshown reel on the axis 21, and the shaft 34 supports a pulley 36 which rotates with the rotation of the unshown reel and is coaxial with the reel axis 21.

A belt 37 is trained on the pulleys 33 and 36 and thereby transmits the rotational drive from the reel to the brush 18 with that rotation being in the common or same direction between the two parts.

FIG. 1, and FIGS. 2 and 4, show a two-piece cover for enclosing the pulleys 33 and 36 and the belt 37. Those pieces are the planar cover piece 38 and the outer cup-shaped piece 39, both of which are suitably attached relative to the side plate 11, such as shown in FIGS. 2 and 4.

The cover piece 38 is planar and has holes 41 and 42 in opposite ends thereof for respective passage of the shafts 18 and 34, and it also has means for threadedly attaching to the side plate 11, in a conventional manner, such as with the cap screws 17. Also, the cover part 38 presents two screws 43 which extend through openings 44 in the outer or cup-shaped cover piece 39, and nuts 46 thus secure the cover piece 39 to the piece 38 and in position to enclose and surround the pulleys 33 and 36 and the belt 37. Also, the cover piece 39 has an extended portion 47 which projects outwardly to accommodate the side extension 48 of the pulley 36.

With the aforementioned arrangement, the brush 18 is rotatably mounted and can be rotated off the rotation of the reel, and that rotational drive is in the arrangement of two pulleys and a belt all of which is enclosed by a cover, and there is no requirement for gears, belt idler, or the like, in the arrangement as more fully described hereinafter.

FIGS. 1 and 3 show that the bearing housings 22,23 have slots 49 which are elongated to extend generally toward the longitudinal axis of the roller 13. The bolts 32 extend through the elongated slots 49 and into the respective side plate bolt openings 51.

To complete the mounting of the bearing housings 22 and 23, and the bearings 24 and 26, that is the herein defined supports for the brush 18, the side plates 11 and 12 are disposed on a respective upright plane and have elongated slots 52 and 53. These respective slots 52 and 53 align with the shown screw holes on the bearing housings 22 and 23 and all receives the respective screws 31. In that manner, the brush supports, and thus the brush 18, are suitably attached to the mower 10. By virtue of the slots 49, 52,53, relative to each side plate 11 and 12, the brush supports are adjustable for movement of the brush 18 toward and away from the roller 13. In that action, the brush can be properly positioned for engaging the surface of the roller 13, and that positioning will affect the tension in the belt 37. That is, the slots 49,52,53 are oriented or faced with their lengths extending generally in line with the reel axis 21 and that would be of course the axis of the pulley 36, and those four slots are shown in two pairs consisting of one slot 49 and slot 52 and the other slot 49 and slot 53. The slots are shown to be elongated and the respective pairs are aligned with each other in their lengths.

To accommodate the variations that might occur with the tension in belt 37, the pulley 36 is an automatically-adjusting pulley, such as shown in FIGS. 5 and 6. Thus, depending upon brush positioning, belt lengths due to wear or new replacement, the preferred tension for the belt 37 is automatically achieved by virtue of the self-adjusting pulley 36 which has two halves 54 and 56 with the half 54 being slidably mounted on the pulley support shaft 34 for movement toward and away from the half 56. Thus, a set screw 58 secures the half 56 to the shaft 34, and a compression spring 59, with the backing of a washer 61, yieldingly urges the half 54 toward the half 56 and thus onto the unshown but intervening belt 37. The pulley position in FIG. 6 would accommodate the longer length regarding the belt 37, while the pulley position in FIG. 5, which is the opened position, would accommodate the shorter length for the belt 37.

With that arrangement, there is no need for a belt idler pulley nor is there any need for other adjustment for the belt tension, and thus the desired drive between the pulleys 36 and 33, because it is automatic and can be completely enclosed by virtue of the two-piece cover heretofore described.

Thus, FIG. 3 shows the assembly without either piece 38 or 39 of the cover, and it also shows the ends of the slots 49 and 52. In the absence of the belt 37 and the pulleys 33 and 36, the cover piece 38 is placed beside side plate 11, such as shown in FIG. 2. Finally, the outer and cup-shaped cover piece 39 is placed over the belt and pulleys, as seen in FIG. 4 in the final assembly. The automatically adjustable pulley allows for adjustably positioning the brush relative to the roller but without any need to adjust belt tension beyond that.

The conventional rotatably mounted mowing reel utilized in this assembly is represented by the reel shaft 20 which is on the longitudinal axis 21 and which extends between the side plates 11 and 12 in the conventional arrangement.

What is claimed is:

1. A lawn mower roller brush mounting and drive comprising
   a lawn mower frame having two spaced-apart and uprightly disposed plates,
   a mower cutting reel rotatably mounted on said plates and having a longitudinal axis extending between said plates,
   a lawn roller rotatably mounted on said plates and having a longitudinal axis extending parallel to said reel axis,
   a roller brush support mounted on each of said plates and presenting a single longitudinal axis disposed parallel to both the first-mentioned two axes, and with said reel axis and said brush axis being disposed to be on respectively opposite sides of said roller axis,
   each said brush support and each of said plates having elongated slots respectively aligned with each other and with the length of each of said slots being disposed radially of said longitudinal axes of said roller and said brush support, and at least substantially radially of said longitudinal axis of said reel, to extend substantially in an arrangement whereby said axis of said supports is movable along said upright plane and thereby toward and away from both said roller axis and said reel axis,
   a brush rotatably mounted on said supports and being arranged to be rotatable about said axis of said supports,
   a belt pulley mounted on each of said reel and said brush and being in respective rotation drive connection with both said reel and said brush,
   fasteners extending through said slots for releasably securing said brush relative to said roller,
   a belt trained on said pulleys and extending directly therebetween, and free of any belt idler, for rotating said brush upon rotation of said reel, and
   one of said pulleys being self-adjusting relative to said belt and thereby being arranged to take up slack in said belt and thereby self-adjustingly control the tension in said belt and thus accommodate the aforesaid toward and away movement of said brush and any change in the length in said belt.

2. The lawn mower roller brush mounting and drive as claimed in claim 1, including
   a cover releasably attached to one of said side plates and completely extending over said pulleys and said belt and being arranged to completely enclose said pulleys and said belt.

3. The lawn mower roller brush mounting and drive as claimed in claim 2, wherein
   said cover consists of a first planar piece and a second cup-shaped piece and said first piece is mounted relative to said one plate,
   mounting attachments on said first piece, and
   said cup-shaped second piece being removably attached to said first piece through said mounting attachments and extending over said belt.

4. The lawn mower roller brush mounting and drive as claimed in claim 1, wherein
   said slots being four in total number and are arranged to form two pairs of said slots by having two of said slots on said plates and another two thereof on said supports, and said respective pairs of said slots being elongated substantially along a respective line extending from said axis of said reel to said axis of said brush for movement of said brush substantially along said line.

5. The lawn mower roller brush mounting and drive as claimed in claim 1, wherein said one of said pulleys is mounted on said reel for rotation therewith, and said belt is trained on said pulleys in an arrangement to transmit the same direction of rotation of said reel to said brush.

6. The lawn mower roller brush mounting and drive as claimed in claim 1, wherein said self-adjusting pulley includes two sides with one of said sides being movable toward and away from the other of said sides for adjusting of said self-adjusting pulley, and a spring operative on said one of said two sides of said self-adjusting pulley and being arranged to urge said self-adjusting pulley to a closed position to thereby tighten said self-adjusting pulley onto said belt.

* * * * *